United States Patent
Huynh

(10) Patent No.: US 7,059,563 B2
(45) Date of Patent: Jun. 13, 2006

(54) SYSTEMS, APPARATUSES, AND METHODS FOR MOVING AIRCRAFT CONTROL SURFACES

(75) Inventor: Neal V. Huynh, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/454,417

(22) Filed: Jun. 3, 2003

(65) Prior Publication Data

US 2004/0245386 A1    Dec. 9, 2004

(51) Int. Cl.
*B64C 3/40*    (2006.01)
(52) U.S. Cl. .......................... 244/78; 244/226
(58) Field of Classification Search ............... 244/226, 244/78; 60/428, 429, 430, 446, 468
See application file for complete search history.

(56) References Cited

U.S. PATENT DOCUMENTS

| | | |
|---|---|---|
| 1,770,575 A | 7/1930 | Ksoll |
| 2,387,492 A | 10/1945 | Blaylock et at. |
| 2,422,196 A | 6/1947 | Flader et al |
| 2,422,296 A | 6/1947 | Flader et al |
| 2,458,900 A | 1/1949 | Erny |
| 2,652,812 A | 9/1953 | Fenzl |
| 2,665,084 A | 1/1954 | Feeney et al |
| 2,864,239 A | 12/1958 | Taylor |
| 2,891,740 A | 6/1959 | Campbell |
| 2,892,312 A * | 6/1959 | Allen et al. ............... 60/427 |
| 2,920,844 A | 1/1960 | Marshall et al |
| 2,990,144 A | 6/1961 | Hougland |
| 2,990,145 A | 6/1961 | Hougland |
| 3,102,607 A | 9/1963 | Roberts |
| 3,112,089 A | 11/1963 | Dornier |
| 3,136,504 A * | 6/1964 | Carr ............................ 244/78 |
| 3,191,147 A | 6/1965 | Majendie |
| 3,375,998 A | 4/1968 | Alvarez-Calderon |
| 3,447,763 A | 6/1969 | Allcock |
| 3,504,870 A | 4/1970 | Cole et al. |
| 3,556,439 A | 1/1971 | Autry et al. |
| 3,653,611 A | 4/1972 | Trupp et al. |
| 3,704,828 A | 12/1972 | Studer et al. |

(Continued)

FOREIGN PATENT DOCUMENTS

EP    0 103 038    3/1984

(Continued)

OTHER PUBLICATIONS

Boeing, 777 Aircraft Maintenance Manual, Sep. 5, 2002 (p. 39).

(Continued)

*Primary Examiner*—Tien Dinh
(74) *Attorney, Agent, or Firm*—Perkins Coie LLP

(57) ABSTRACT

Aircraft control surface operating systems and apparatuses, and associated methods of use. In one embodiment, an aircraft system includes an actuator operably coupled to a control surface in one-to-one correspondence. The actuator can include at least a first fluid port and a second fluid port. A first fluid circuit can be configured to provide pressurized working fluid from a fluid source to the first fluid port on the actuator to retract the actuator. A second fluid circuit can be configured to similarly provide pressurized working fluid from the fluid source to the second fluid port on the actuator to extend the actuator. The aircraft system can further include an accumulator configured to store pressurized working fluid for actuator operation in the event of a pressure drop in the fluid source.

17 Claims, 7 Drawing Sheets

U.S. PATENT DOCUMENTS

| | | | |
|---|---|---|---|
| 3,704,843 A | 12/1972 | Jenny | |
| 3,743,219 A | 7/1973 | Gorges | |
| 3,794,276 A | 2/1974 | Maltby et al. | |
| 3,831,886 A | 8/1974 | Burdges et al. | |
| 3,836,099 A | 9/1974 | O'Neill et at. | |
| 3,837,601 A | 9/1974 | Cole | |
| 3,862,730 A | 1/1975 | Heiney | |
| 3,910,530 A | 10/1975 | James et al. | |
| 3,941,334 A | 3/1976 | Cole | |
| 3,941,341 A | 3/1976 | Brogdon, Jr. | |
| 3,968,946 A | 7/1976 | Cole | |
| 3,992,979 A * | 11/1976 | Smith | 91/523 |
| 3,994,451 A | 11/1976 | Cole | |
| 4,015,787 A * | 4/1977 | Maieli et al. | 244/215 |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth | |
| 4,240,255 A * | 12/1980 | Benilan | 60/453 |
| 4,247,843 A | 1/1981 | Miller | |
| 4,262,868 A | 4/1981 | Dean | |
| 4,275,942 A | 6/1981 | Steidl | |
| 4,285,482 A | 8/1981 | Lewis | |
| 4,293,110 A | 10/1981 | Middleton | |
| 4,312,486 A | 1/1982 | McKinney | |
| 4,325,123 A | 4/1982 | Graham | |
| 4,351,502 A | 9/1982 | Statkus | |
| 4,353,517 A | 10/1982 | Rudolph | |
| 4,368,937 A | 1/1983 | Palombo et al. | |
| 4,384,693 A | 5/1983 | Pauly | |
| 4,427,168 A | 1/1984 | McKinney | |
| 4,441,675 A | 4/1984 | Boehringer | |
| 4,461,449 A | 7/1984 | Turner | |
| 4,471,927 A | 9/1984 | Rudolph | |
| 4,475,702 A | 10/1984 | Cole | |
| 4,485,992 A | 12/1984 | Rao | |
| 4,496,121 A * | 1/1985 | Berlin | 244/75 A |
| 4,498,646 A | 2/1985 | Proksch | |
| 4,533,096 A | 8/1985 | Baker | |
| 4,553,722 A | 11/1985 | Cole | |
| 4,575,030 A | 3/1986 | Gratzer | |
| 4,576,347 A | 3/1986 | Opsahl | |
| 4,637,573 A | 1/1987 | Perin | |
| 4,650,140 A | 3/1987 | Cole | |
| 4,700,911 A | 10/1987 | Zimmer | |
| 4,702,441 A | 10/1987 | Wang | |
| 4,706,913 A | 11/1987 | Cole | |
| 4,717,097 A | 1/1988 | Sepstrup | |
| 4,729,528 A | 3/1988 | Borzachillo | |
| 4,784,355 A | 11/1988 | Brine | |
| 4,786,013 A | 11/1988 | Pohl | |
| 4,792,906 A | 12/1988 | King | |
| 4,856,735 A | 8/1989 | Lotz | |
| 4,860,007 A | 8/1989 | Konicke | |
| 4,899,284 A | 2/1990 | Lewis | |
| 4,962,902 A | 10/1990 | Fortes | |
| 5,046,688 A | 9/1991 | Woods | |
| 5,074,495 A * | 12/1991 | Raymond | 244/78 |
| 5,082,208 A | 1/1992 | Matich | |
| 5,088,665 A | 2/1992 | Vijgen | |
| 5,094,411 A | 3/1992 | Rao | |
| 5,094,412 A | 3/1992 | Narramore | |
| 5,100,082 A | 3/1992 | Archung | |
| 5,114,100 A | 5/1992 | Rudolph | |
| 5,129,597 A | 7/1992 | Manthey | |
| 5,158,252 A | 10/1992 | Sakurai | |
| 5,167,383 A | 12/1992 | Nozaki | |
| 5,203,619 A | 4/1993 | Welsch | |
| 5,207,400 A | 5/1993 | Jennings | |
| 5,244,269 A | 9/1993 | Harriehausen | |
| 5,259,293 A * | 11/1993 | Brunner | 91/420 |
| 5,351,914 A | 10/1994 | Nagao | |
| 5,420,582 A | 5/1995 | Kubbat | |
| 5,441,218 A | 8/1995 | Mueller | |
| 5,474,265 A | 12/1995 | Capbern | |
| 5,535,852 A | 7/1996 | Bishop | |
| 5,544,847 A | 8/1996 | Bliesner | |
| 5,600,220 A | 2/1997 | Thoraval | |
| 5,609,020 A | 3/1997 | Jackson | |
| 5,680,124 A | 10/1997 | Bedell | |
| 5,686,907 A | 11/1997 | Bedell | |
| 5,715,163 A | 2/1998 | Bang | |
| 5,743,490 A | 4/1998 | Gillingham | |
| 5,746,490 A | 5/1998 | Domenig | |
| 5,788,190 A | 8/1998 | Siers | |
| 5,875,998 A | 3/1999 | Gleine | |
| 5,921,506 A | 7/1999 | Appa | |
| 5,927,656 A | 7/1999 | Hinkleman | |
| 5,934,615 A | 8/1999 | Treichler | |
| 5,978,715 A | 11/1999 | Briffe | |
| 5,984,230 A | 11/1999 | Orazi | |
| 6,015,117 A | 1/2000 | Broadbent | |
| 6,045,204 A | 4/2000 | Frazier | |
| 6,057,786 A | 5/2000 | Briffe | |
| 6,073,624 A | 6/2000 | Laurent | |
| 6,076,767 A * | 6/2000 | Farley et al. | 244/78 |
| 6,076,776 A | 6/2000 | Breitbach | |
| 6,085,129 A | 7/2000 | Schardt | |
| 6,109,567 A | 8/2000 | Munoz | |
| 6,112,141 A | 8/2000 | Briffe | |
| 6,161,801 A | 12/2000 | Kelm | |
| 6,188,937 B1 | 2/2001 | Sherry | |
| 6,213,433 B1 | 4/2001 | Gruensfelder | |
| 6,293,497 B1 | 9/2001 | Kelley-Wickemeyer | |
| 6,328,265 B1 | 12/2001 | Dizdarevic | |
| 6,349,798 B1 | 2/2002 | McKay | |
| 6,364,254 B1 | 4/2002 | May | |
| 6,375,126 B1 | 4/2002 | Sakurai | |
| 6,389,333 B1 | 5/2002 | Hansman | |
| 6,443,394 B1 | 9/2002 | Weisend | |
| 6,484,969 B1 | 11/2002 | Sprenger | |
| 6,499,577 B1 * | 12/2002 | Kitamoto et al. | 192/85 R |
| 6,536,714 B1 | 3/2003 | Gleine | |
| 6,547,183 B1 | 4/2003 | Farnsworth | |
| 6,554,229 B1 | 4/2003 | Lam | |
| 6,591,169 B1 | 7/2003 | Jones | |
| 6,598,829 B1 | 7/2003 | Kamstra | |
| 6,598,834 B1 | 7/2003 | Nettle | |
| 6,601,801 B1 | 8/2003 | Prow | |
| 6,622,972 B1 | 9/2003 | Urnes | |
| 6,625,982 B1 | 9/2003 | Van Den Bossche | |
| 6,644,599 B1 | 11/2003 | Perez | |
| 6,651,930 B1 * | 11/2003 | Gautier et al. | 244/75 R |
| 6,745,113 B1 | 6/2004 | Griffin | |
| 6,796,534 B1 | 9/2004 | Beyer | |
| 6,799,739 B1 | 10/2004 | Jones | |
| 2002/0100842 A1 | 8/2002 | Perez | |
| 2003/0058134 A1 | 3/2003 | Sherry | |
| 2003/0132860 A1 | 7/2003 | Feyereisen | |
| 2004/0004162 A1 | 1/2004 | Beyer | |
| 2004/0059474 A1 | 3/2004 | Boorman | |
| 2004/0195464 A1 | 10/2004 | Vassberg et al. | |
| 2005/0011994 A1 | 1/2005 | Sakurai et al. | |
| 2005/0017126 A1 | 1/2005 | McLean et al. | |

FOREIGN PATENT DOCUMENTS

| | | |
|---|---|---|
| EP | 0 370 640 | 5/1990 |
| EP | 0 489 521 | 6/1992 |

| EP | 0 947 421 | 10/1999 |
| GB | 886136 | 1/1962 |
| GB | 2 144 688 A | 3/1985 |
| WO | WO-02/24530 | 3/2002 |

OTHER PUBLICATIONS

MOOG, Component Maintenance Manual, May 1994 (2 pages).
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et at.
U.S. Appl. No. 10/814,369, Chen et al.
U.S. Appl. No. 10/814,494, Gun et al.
U.S. Appl. No. 10/815,034, Crane et al.
U.S. Appl. No. 60/475,828, Beyer
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Paten Application No. EP 03 07 7840, The Boeing Company, Nov. 4, 2003 (2 pgs).
Flap Transmission and Support, 777 Maintenance Manual, Publication Date: Circa 1994 (1 page).
International Search Report, PCT/US03/19724, Sep. 11, 2003, 5 pgs.
Niu, Chen-Yen, Airframe Structural Design, Chen-Yeun Niu, Conmilit Press, 1988 (1 page).
Drela, M., "Optimization Techniques In Airfoil Design," MIT Aero & Astro, 29 pages.
Flap Drive System, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M ( 2 pages); http://www.wpafb.af.mil/museum/outdoor/od16 [Accessed Aug. 7, 2003].
Petrov, A.V., "Certain Types of Separated Flow over Slotted Wings," Fluid Mechanics Soviet Research, vol. 7, No. 5, Sep.-Oct. 1978, p. 80-89.
The High Speed Frontier, Chapter 2: The High-Speed Airfoil Program, "Supercritical" Airfoils, 1957-1978 (4 pages) http://www.hg.nasa.gov/office/pao/History/SP-445/ch2-5.
TU-144 Canard, (date unknown), 1 pg.
Whitcomb, Richard T., "Review of NASA Supercritical Airfoils," National Aeornautics and Space Administration, Aug. 1974 (pp. 8-18).
Drela, Mark, "Design and Optimization Method for Multi-Element Airfoils," MIT Department of Aeronautics and Astronautics, pp. 7 and 9, figure 3, 7, and 8.

* cited by examiner

SYSTEMS, APPARATUSES, AND METHODS FOR MOVING AIRCRAFT CONTROL SURFACES

CROSS-REFERENCE TO RELATED APPLICATION(S)

This application relates to pending U.S. Patent Application Ser. No. 60/475,828, entitled "Multi-Function Trailing Edge Devices and Associated Methods," filed concurrently herewith and incorporated in its entirety by reference.

TECHNICAL FIELD

The following disclosure relates generally to aircraft control surfaces and, more particularly, to systems and apparatuses for moving such control surfaces.

BACKGROUND

All aircraft include movable control surfaces for directional control in flight. Such control surfaces can include primary flight control surfaces for general flight path control, as well as various lift and drag devices for take off and landing. Primary flight control surfaces can include ailerons for roll control, elevators for pitch control, and rudders for yaw control. Conventional lift and drag devices can include leading edge slats, trailing edge flaps, and spoilers.

FIG. 1 is a schematic top view of a conventional control surface operating system 101 configured in accordance with the prior art. The prior art system 101 includes a movable control surface 104 (such as an aileron) pivotally attached to a wing 102 about a hinge line 106. Redundant actuators 108 (shown as a first actuator 108a and a second actuator 108b) are operably coupled between the control surface 104 and the wing 102 such that simultaneous extension of the actuators 108 causes the control surface 104 to pivot about the hinge line 106 in a first direction, and simultaneous retraction of the actuators 108 causes the control surface 104 to pivot about the hinge line 106 in a second direction opposite to the first direction.

Each of the actuators 108 receives hydraulic power from an independent hydraulic system 103 for redundancy. The hydraulic systems 103 are essentially identical, and each includes an electro-hydraulic servo valve 112, a solenoid valve 114, and a mode selector valve 116 (shown in a closed or "blocked") position in FIG. 1). In addition, the hydraulic systems 103 further include a fluid inlet circuit 111 and a fluid outlet circuit 113. The fluid inlet circuit 111 passes pressurized hydraulic fluid from a fluid source through a check valve 105 and a filter 107 to the electro-hydraulic servo valve 112 and the solenoid valve 114. The fluid outlet circuit 113 returns low pressure hydraulic fluid from the electro-hydraulic servo valve 112, the solenoid valve 114, and the mode selector valve 116 to the fluid source.

In operation, a flight control computer 118 receives a control input from the pilot and responds by energizing the solenoid valve 114. When energized, the solenoid valve 114 allows pressurized hydraulic fluid to pass to the mode selector valve 116. This pressurized fluid causes a piston or slider 117 within the mode selector valve 116 to move downward against a spring 119 switching the mode selector valve 116 from the blocked mode shown in FIG. 1 to an active mode. In the active mode, the mode selector valve 116 allows pressurized hydraulic fluid to flow from the electro-hydraulic servo valve 112 to the actuator 108 in response to signals from the flight control computer 118. The flight control computer 118 controls the flow of pressurized hydraulic fluid into and out of the actuator 108 as required to move the control surface 104 in accordance with the pilot's input. Under normal operating conditions, both hydraulic systems 103 respond to control signals from the flight control computer 118 as described above to move the actuators 108 in unison and provide the desired control surface movement.

The conventional control surface actuation architecture described above with reference to FIG. 1 provides redundancy for meeting the requirements of being fail-operative for a first component failure and fail-safe for a second component failure. For example, if one component associated with the first actuator 108a (such as the electro-hydraulic servo valve 112) fails, then the computer 118 sends a signal to the solenoid valve 114 causing the mode selector valve 116 to block the flow from the electro-hydraulic servo valve 112 to the actuator 108a. At the same time, the selector valve 116 enables the first actuator 108a to be operated in a bypass mode such that the control surface 104 can be moved solely by the second actuator 108b. If, however, there is a second component failure (for example, such as if both of the electro-hydraulic servo valves 112 fail) then the computer 118 deenergizes both of the solenoid valves 114 causing both of the mode selector valves 116 to move to the blocked mode as shown in FIG. 1. When the mode selection valves 116 are in the blocked mode, the actuators 108 are held in position. Holding the control surface 104 in position in the event of a double failure such as this prevents the control surface 104 from experiencing aerodynamic flutter, which can lead to structural damage. Thus, the prior art system 101 is fail-operative for a single failure because at least one of the actuators 108 can sufficiently operate the control surface 104 under a single failure such as that described above. Further, the prior art system 101 is fail-safe for a double failure because under such a condition both actuators 108 will lock in position and prevent the control surface 104 from experiencing potentially harmful aerodynamic flutter.

One shortcoming of the prior art control surface operating system 101 is the additional cost associated with providing redundant actuator systems. Another shortcoming is the additional airframe weight that such systems add. In addition to these shortcomings, employing multiple actuators on a common control surface often results in a "force fight" between the two actuators each time they move the control surface. Force fights result from the inevitable differences that exist between the forces applied to the control surface by the two actuators. Force fights can introduce high fatigue cycling on structural members. As a result, such members have to be designed with increased structural weight to carry the increased fatigue loads. Further, force fights can result in an undesirable dead band of control surface movement at or near the valve null position, causing poor control surface positionability and responsiveness. Efforts to reduce force fights between redundant actuators generally increase the complexity of the control systems, which in turn increases the cost and weight of such systems. The added complexity of the control systems leads to further complexity in the flight control software that the flight control computer uses to control the hydraulic systems and reduce the force fight between actuators.

Yet another shortcoming associated with redundant actuator systems is that the sub-system components are typically over-designed. These components are over-designed because one actuator system (i.e. one actuator plus the associated hydraulic system) must be capable of moving the control surface (and the other actuator in bypass mode) without any help from the other actuator system in the event of a system failure. This over-design means that under normal operating conditions when both actuators are operative the aircraft will be providing about twice as much power to the control surface operating system as is actually needed to move the control surfaces. Further, this over-design results in heavier hydraulic and control system components, and the resulting hydraulic power extraction can reduce the overall fuel efficiency of the aircraft.

SUMMARY

The present invention is directed generally toward aircraft control surface operating systems and apparatuses. An aircraft system configured in accordance with one aspect of the invention includes an actuator and a fluid distribution system. The actuator can include an actuator body having at least a first fluid port and a second fluid port. The fluid distribution system can have at least a first fluid circuit and a second fluid circuit. The first fluid circuit can be configured to provide pressurized working fluid from a fluid source to the first fluid port on the actuator body to position the actuator in a first configuration. Similarly, the second fluid circuit can be configured to provide pressurized working fluid from the fluid source to the second fluid port on the actuator body to position the actuator in a second configuration different than the first configuration. The aircraft system can further include a fluid accumulator positioned to accumulate pressurized working fluid received from the fluid source. The fluid accumulator can be configured to provide pressurized working fluid to the first fluid circuit or the second fluid circuit to position the actuator in a desired configuration if the fluid source loses pressure.

In another aspect of the invention, an aircraft system can include an actuator having an actuator body with a first piston bore and a second piston bore. The actuator body can further include first and second fluid ports in communication with the first piston bore, and third and fourth fluid ports in communication with the second piston bore. A first piston can be slidably positioned within the first piston bore, and a second piston can be slidably positioned within the second piston bore. Providing pressurized working fluid to at least one of the first fluid port and the third fluid port causes the first and second pistons to move in a first direction to position the actuator in a first configuration. Providing pressurized working fluid to at least one of the second fluid port and the fourth fluid port causes the first and second pistons to move in a second direction opposite to the first direction to position the actuator in a second configuration.

In a further aspect of the invention, a method for moving an aircraft control surface can include moving the control surface at a first rate in a first flight mode, and moving the control surface at a second rate slower than the first rate in a second flight mode. To move the control surface at the first rate, the method can include providing pressurized working fluid to a first piston bore and an actuator operably coupled to the control surface. The first piston bore can house a first piston having a first piston area. The first piston can be configured to move back and forth in the first piston bore to move the control surface at the first rate. To move the control surface at the second rate, the method can further include providing pressurized working fluid to a second piston bore in the actuator. The second piston bore can house a second piston having a second piston area greater than the first piston area. The second piston can be configured to move fore and aft in the second piston bore to move the control surface at the second rate slower than the first rate.

DETAILED DESCRIPTION

The following disclosure describes aircraft control surface operating systems, and actuators usable with such systems. Certain specific details are set forth in the following description and in FIGS. 1–9 to provide a thorough understanding of various embodiments of the invention. Other details describing well-known structures and systems often associated with aircraft, and more specifically, with aircraft control surface operating systems, are not set forth in the following description to avoid unnecessarily obscuring the description of the various embodiments of the invention.

Many of the details, dimensions, angles, and other specifications shown in the Figures are merely illustrative of particular embodiments of the invention. Accordingly, other embodiments can have other details, dimensions, and specifications without departing from the spirit or the scope of the present invention. In addition, other embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 210 is first introduced and discussed with reference to FIG. 2.

Figure 1:
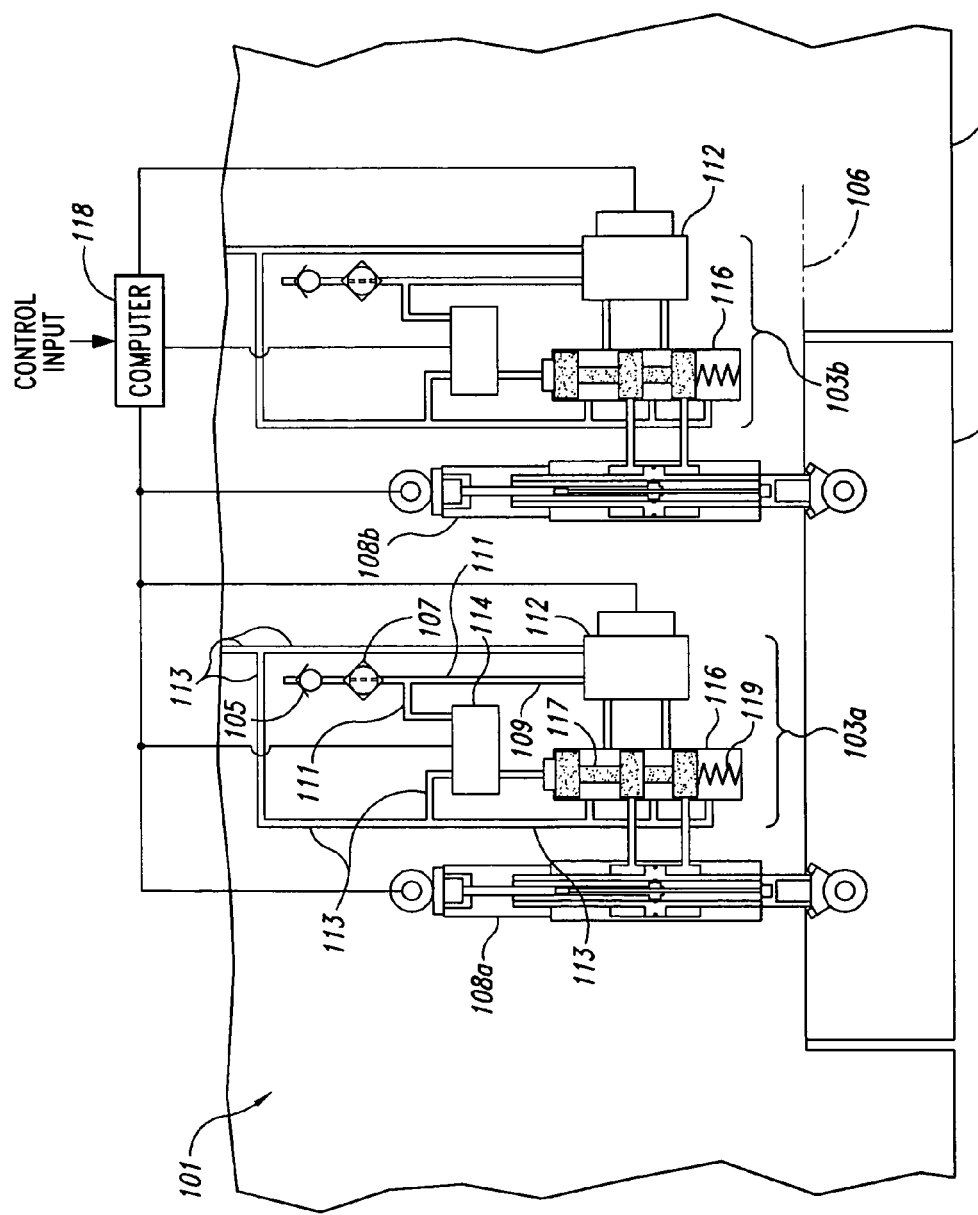
FIG. 1 is a schematic top view of a conventional control surface operating system configured in accordance with the prior art.
Figure 2:
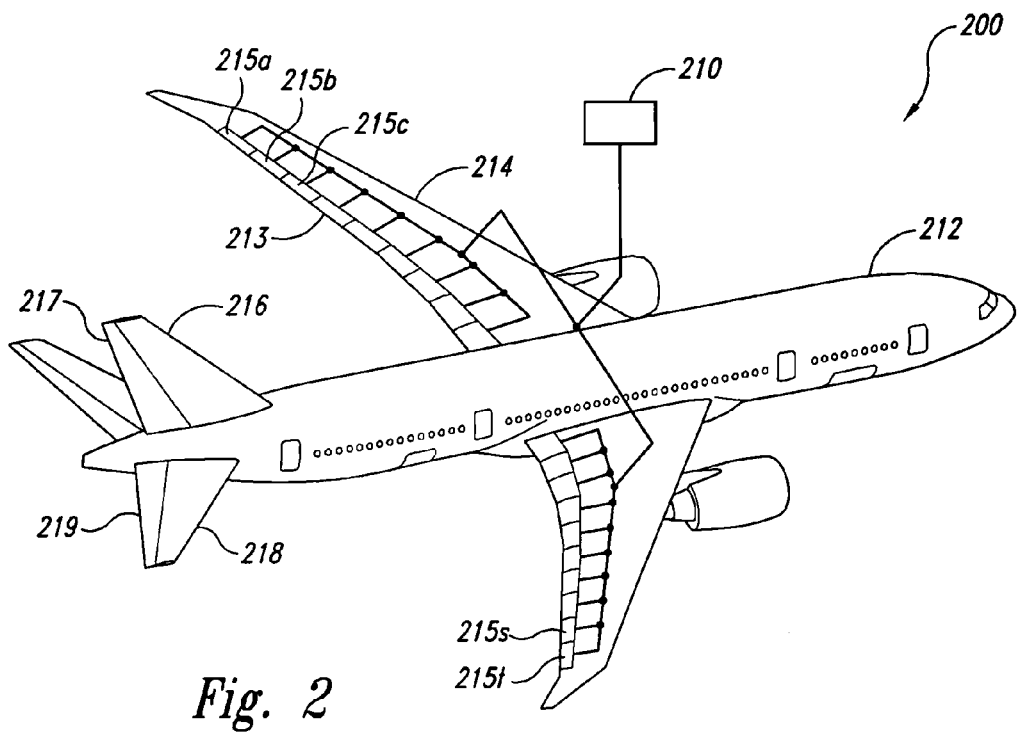
FIG. 2 is a top isometric view of an aircraft having a control surface operating system configured in accordance with an embodiment of the invention.

FIG. 2 is a partially schematic top isometric view of an aircraft 200 having a control surface operating system 210 ("operating system 210") configured in accordance with an embodiment of the invention. In one aspect of this embodiment, the aircraft 200 includes a wing 214 extending outwardly from a mid-portion of a fuselage 212, and a vertical stabilizer 216 and a horizontal stabilizer 218 extending outwardly from a tail-portion of the fuselage 212. The aircraft 200 can further include a plurality of movable control surfaces for providing directional control and/or generating lift and drag during flight. Such control surfaces can include an elevator 219 pivotally coupled to the horizontal stabilizer 218, and a rudder 217 pivotally coupled to the vertical stabilizer 216. Such control surfaces can further include a plurality of movable control surfaces 215 (shown as control surfaces 215a–t) pivotally coupled at least proximate to a trailing edge 213 of the wing 214. In another aspect of this embodiment described in greater detail below, the operating system 210 (shown schematically in FIG. 2) can selectively move the control surfaces 215 in various combinations of coordinated and differential movements as required to perform the functions traditionally associated with conventional ailerons and/or trailing edge flaps.

Figure 3:
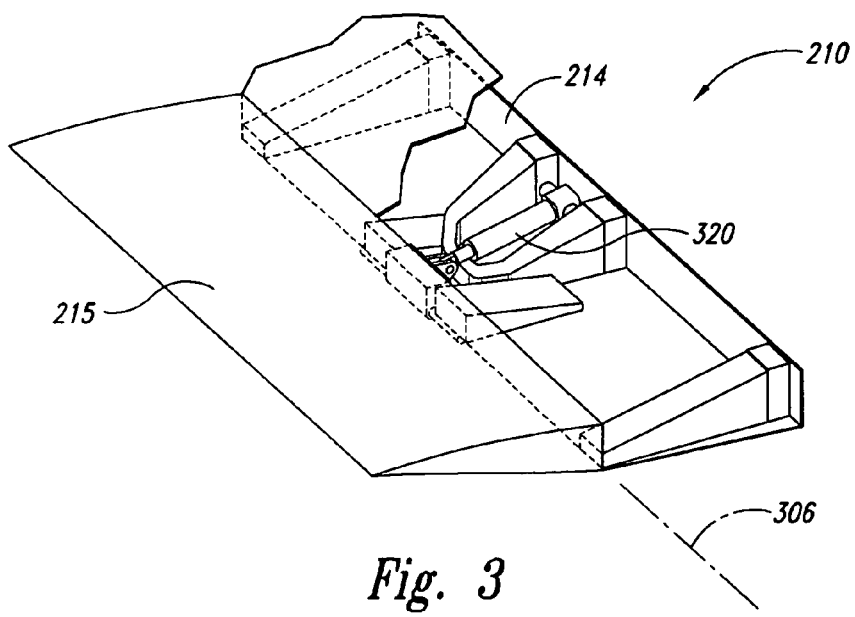
FIG. 3 is an enlarged top isometric view of a portion of the control surface operating system of FIG. 2, configured in accordance with an embodiment of the invention.

FIG. 3 is an enlarged top isometric view of a portion of the control surface operating system 210 of FIG. 2, configured in accordance with an embodiment of the invention. The outer skin has been removed from the wing 214 and the control surface 215 in FIG. 3 for purposes of clarity. In one aspect of this embodiment, the control surface 215 is pivotally coupled to the wing 214 about a hinge line 306. An actuator 320 can be operably coupled between the control surface 215 and the wing 214 such that extension and retraction of the actuator 320 causes the control surface 215 to pivot about the hinge line 306.

Figure 4A:
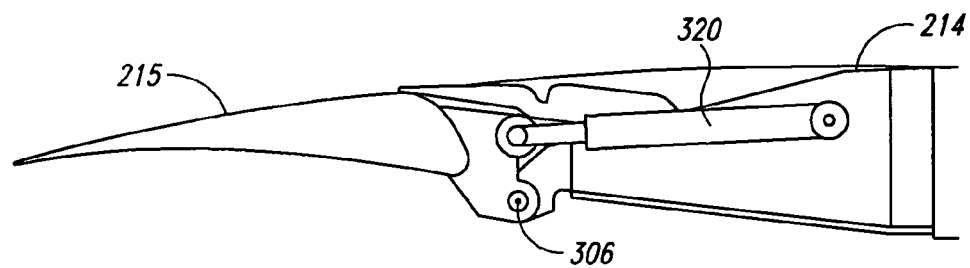
FIGS. 4A–C are side cross-sectional views of the control surface operating system portion shown in FIG. 3.
Figure 4B:
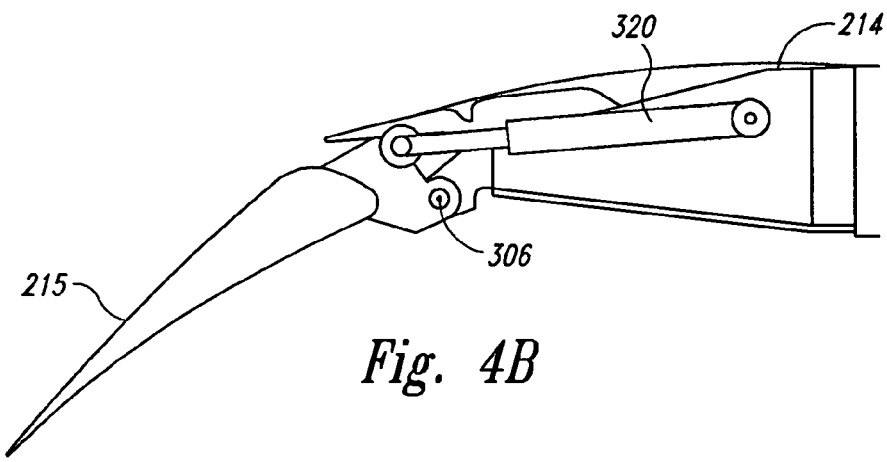
Figure 4C:
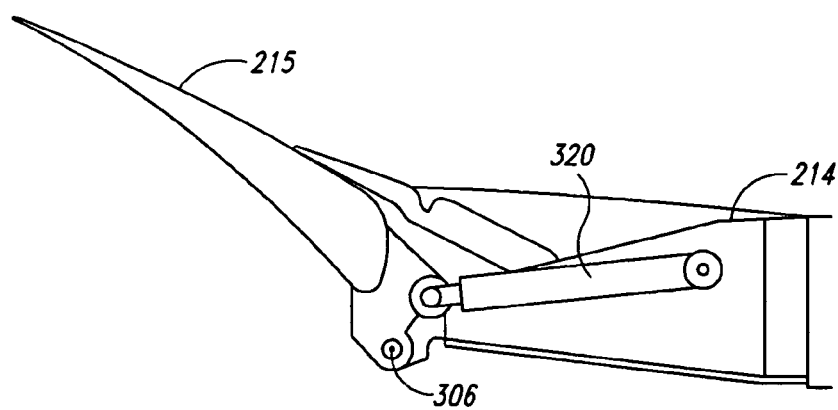

FIGS. 4A–C are enlarged side cross-sectional views of the wing portion shown in FIG. 3. Referring first to FIG. 4A, in one aspect of this embodiment, when the actuator 320 is in a first or "centered" configuration, the actuation 320 positions the control surface 215 in a corresponding first or centered position with respect to the wing 214. As shown in FIG. 4B, as the actuator 320 extends to a second or extended configuration, the actuation 320 pivots the control surface 215 downwardly about the hinge line 306 toward a corresponding second or lower position with respect to the wing 214. Referring next to FIG. 4C, as the actuator 320 retracts to a third or retracted configuration, the actuation 320 pivots the control surface 215 upwardly about the hinge line 306 toward a corresponding third or upper position with respect to the wing 714.

FIGS. 4A–C illustrate one way to operably couple the actuator 320 between the wing 214 and the control surface 215 in accordance with the present invention. Accordingly, in other embodiments, the actuator 320 can be operably coupled between the wing 214 and the control surface 215 in other configurations. For example, in one other embodiment, the actuator 320 can be operably coupled to the control surface 215 below the hinge line 306. In such an embodiment, movement of the control surface 215 would be opposite to that described above for a given actuator movement. That is, extension of the actuator 320 would cause the control surface 215 to pivot upwardly instead of downwardly, and retraction of the actuator 320 would cause the control surface 215 to pivot downwardly instead of upwardly. Accordingly, embodiments of the present invention are not limited to the particular actuator/control surface configuration illustrated in FIGS. 3–4C.

One feature of aspects of the embodiment described above with reference to FIGS. 3–4C is that each control surface 215 requires only a single actuator 320 for operation. One advantage of this feature over redundant actuator systems is the weight and cost savings that result from using only one actuator instead of two to move a particular control surface.

Figure 5:
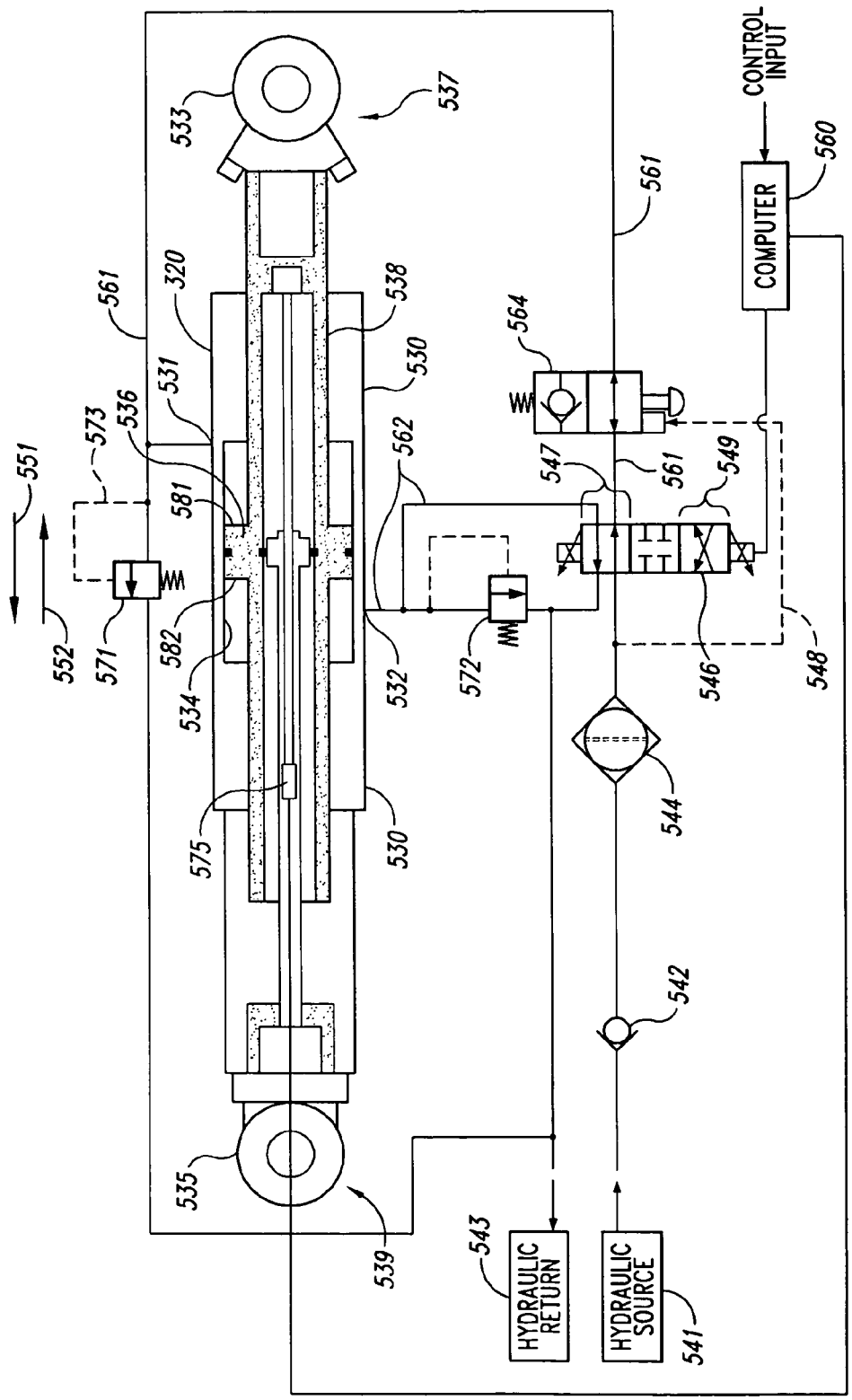
FIG. 5 is a schematic diagram of an actuator and an associated fluid distribution system configured in accordance with an embodiment of the invention.

FIG. 5 is a schematic diagram of the actuator 320 and an associated fluid distribution system 540 configured in accordance with an embodiment of the invention. In one aspect of this embodiment, the actuator 320 includes an actuator body 530 having a piston chamber or bore 534. A slider or piston 536 can be slidably disposed within the piston bore 534, and can include a first piston surface 581 having a first piston area and a second piston surface 582 having a second piston area. In one embodiment, the first and second piston areas can be at least generally equivalent. In other embodiments, the first piston area can be different than the second piston area. The piston 536 can be configured to move in a first direction 551 when the piston bore 534 receives pressurized working fluid from a first fluid port 531. Similarly, the piston 536 can be configured to move in a second direction 552 opposite to the first direction 551 when the piston bore 534 receives pressurized working fluid from a second fluid port 532. The piston 536 can be fixedly attached to a piston rod 538 extending slidably through the actuator body 530. The piston rod 538 can support a first end fitting 533 positioned toward a first actuator end 537. The actuator body 530 can support a second end fitting 535 positioned toward a second actuator end 539. Accordingly, movement of the piston 536 in the first direction 551 relative to the actuator body 530 causes the actuator 320 to retract. Conversely, movement of the piston 536 in the second direction 552 relative to the actuator body 530 causes the actuator 320 to extend.

In another aspect of this embodiment, the actuator 320 can include a position sensor 575 for servo-loop closure configured to measure the position of the first actuator end 537 relative to the second actuator end 539 at any given time. In one embodiment, the position sensor 575 can include a linear variable differential transformer. In other embodiments, the position sensor 575 can include other types of position sensors. For example, in one other embodiment, the position sensor 575 can include a rotary variable differential transformer. In yet a further embodiment, the position sensor can include a proximity switch or the like.

In a further aspect of this embodiment, the fluid distribution system 540 includes a fluid source 541 (shown schematically in FIG. 5) for providing pressurized working fluid to the actuator 320. The fluid source 541 can provide pressurized fluid, such as hydraulic fluid, through an inlet check valve 542 and a filter 544 to an electro-hydraulic servo valve 546 and a pilot pressure circuit 548. The electro-hydraulic servo valve 546 ("EHSV") is operatively connected to a flight control computer 560, and has at least two different operating configurations or positions depending on the nature of the signal received from the computer 560. For example, in a first position (represented by a symbol 547), the EHSV 546 passes pressurized working fluid from the fluid source 541 to a first fluid circuit 561 that delivers the pressurized working fluid to the first fluid port 531 on the actuator body 530. In a second position (represented by a symbol 549), the EHSV 546 passes the pressurized working fluid from the fluid source 541 to a second fluid circuit 562 that delivers the pressurized working fluid to the second fluid port 532 on the actuator body 530.

In yet another aspect of this embodiment, the fluid distribution system 540 includes a check valve 564 positioned within the first fluid circuit 561 between the EHSV 546 and the first fluid port 531. The check valve 564 is configured to open in response to receiving pressurized working fluid from the fluid source 541 via the pilot pressure circuit 548. In addition, the check valve 564 is further configured to close in the absence of receiving pressurized working fluid from the fluid source 541 via the pilot pressure circuit 548. Accordingly, when the fluid source 541 provides pressurized working fluid to the check valve 564 via the pilot pressure circuit 548, the check valve 564 opens allowing working fluid to pass back and forth between the EHSV 546 and the first fluid port 531 as required for movement of the actuator 320. Conversely, when the fluid source 541 does not provide adequate pressurized working fluid to the check valve 564 via the pilot pressure circuit 548 (such as, for example, in the event of a hydraulic system failure), the check valve 564 moves to a checked mode and closes. When closed, the check valve 564 at least generally prevents working fluid from flowing into or out of the first fluid port 531, effectively holding the actuator 320 in position. In other embodiments, the check valve 564 can have other configurations and can open and close in response to other signals. For example, in one other embodiment, the check valve 564 can be an electronic device configured to open and/or close in response to an electrical signal.

In operation, flight control inputs from a pilot or other source for movement of the control surface 215 (FIGS. 2–4C) are sent to the flight control computer 560. The flight control computer 560 sends a corresponding signal to the EHSV 546 causing the EHSV 546 to select the first position 547 or the second position 549 as necessary to provide the desired control surface movement. For example, for upward movement of the control surface 215 as shown in FIG. 4C, the EHSV 546 moves to the first position 547 as shown in FIG. 5. In this position, pressurized working fluid from the fluid source 541 passes through the EHSV 546 to the check valve 564. The pressurized working fluid simultaneously flowing to the check valve 564 via the pilot pressure circuit 548 opens the check valve 564 such that the pressurized working fluid from the EHSV 546 is allowed to pass through the check valve 564 and flow to the first fluid port 531. Consequently, this pressurized working fluid flows into the piston bore 534 from the first fluid port 531 and moves the piston 536 in the first direction 551 causing the actuator 320 to retract. As the piston 536 moves in the first direction 551, low pressure working fluid in front of the piston 536 is driven out of the piston bore 534 via the second fluid port 532. This low pressure working fluid passes through the second fluid circuit 562 and the EHSV 546 to a fluid return reservoir 543. The flight control computer 560 can also receive a feedback signal from the position sensor 575 when the actuator is at the desired position to complete the signal loop (or "servo-loop") for the control system.

For downward movement of the control surface 215 as shown in FIG. 4B, the flight control computer 560 sends a signal to the EHSV 546 causing it to move to the second position 549. In the second position 549, pressurized working fluid from the fluid source 541 passes through the EHSV 546 to the second fluid circuit 562 for delivery to the second fluid port 532. This pressurized working fluid flows into the piston bore 534 from the second fluid port 532 and moves the piston 536 in the second direction 552 causing the actuator 320 to extend. As the piston 536 moves in the second direction 552, low-pressure working fluid in front of the piston 536 flows out of the piston bore 534 via the first fluid port 531. High pressure working fluid received by the check valve 564 via the pilot pressure circuit 548 keeps the check valve 564 open as this low-pressure working fluid flows back through the check valve 564 and the EHSV 546 to the fluid return reservoir 543.

In yet another aspect of this embodiment, the fluid distribution system 540 includes a first relief valve 571 and a second relief valve 572. The first and second relief valves 571, 572 are configured to relieve pressure in the first fluid circuit 561 and the second fluid circuit 562, respectively, in the event the pressure exceeds a preselected level that could be harmful to the fluid distribution system 540, the actuator 320, or the airframe. For example, if the fluid pressure in the first fluid circuit 561 exceeds the preselected level, a bypass circuit 573 opens the first relief valve 571 causing the fluid pressure to drop. Once the fluid pressure drops to the normal operating level, the relief valve 571 closes to maintain the fluid pressure at the normal operating level. The second relief valve 572 operates in a similar manner as the first relief valve 571 to limit the fluid pressure in the second fluid circuit 562.

One feature of aspects of the embodiment described above with reference to FIG. 5 is that the check valve 564 effectively holds the actuator 320 in a given position in the event of a hydraulic system failure. For example, if the fluid source 541 experiences a significant drop in fluid pressure, then the corresponding pressure drop in the pilot pressure circuit 548 will cause the check valve 564 to automatically close. The closed check valve 564 effectively prevents any working fluid from flowing into or out of the piston bore 534 via the first fluid port 531. Preventing the flow of working fluid in this manner restricts motion of the piston 536 and holds the actuator 320 in position. One advantage of this feature is that the control surface operating system can be configured such that if the fluid system loses pressure during the take off phase of flight, the control surface will be held in position at its high lift configuration. As a result, a loss of hydraulic system pressure at this time will not affect the climb gradient of the aircraft. Another advantage is that the control surface will not be allowed to flutter in the event of a hydraulic system failure. Instead, such a failure will result in the corresponding actuator or actuators 320 and the corresponding control surface or control surfaces 215 being held in the last commanded position.

Figure 6:
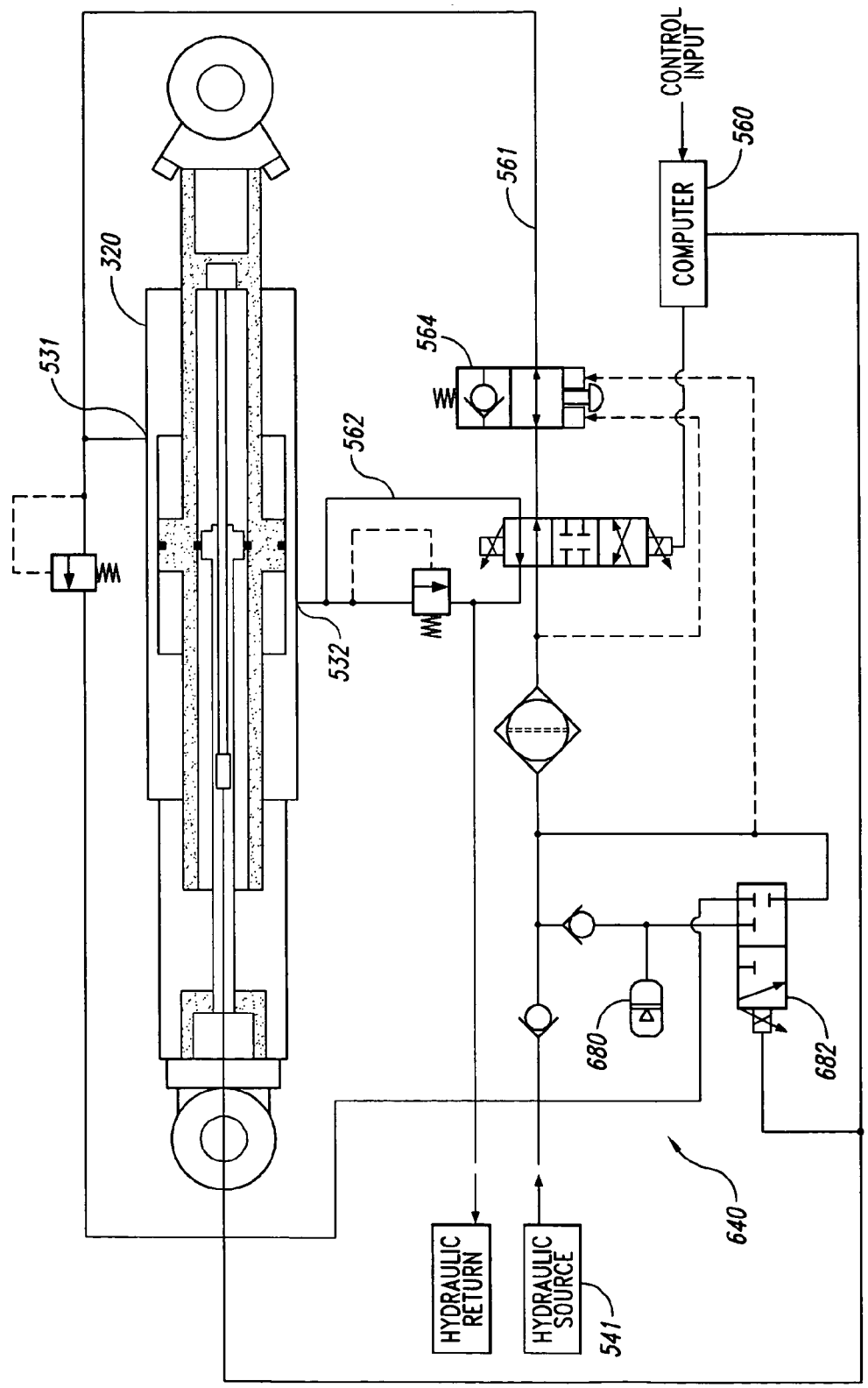
FIG. 6 is a schematic diagram of the actuator of FIG. 5 and another fluid distribution system configured in accordance with an embodiment of the invention.

FIG. 6 is a schematic diagram of the actuator 320 and an associated fluid distribution system 640 configured in accordance with another embodiment of the invention. In one aspect of this embodiment, the fluid distribution system 640 can be similar to the fluid distribution system 540 described above with reference to FIG. 5 and can accordingly share some common components. For example, the fluid distribution system 640 can include the EHSV 546 for selectively directing pressurized working fluid to the first fluid port 531 or the second fluid port 532. In addition, the fluid distribution system 640 can further include the check valve 564 positioned in the first fluid circuit 561 between the EHSV 546 and the first fluid port 531.

In another aspect of this embodiment, however, the fluid distribution system 640 additionally includes a fluid accumulator 680 positioned to receive pressurized working fluid from the fluid source 541. Under normal operating conditions, the fluid accumulator 680 receives pressurized working fluid from the fluid source 541 and holds the pressurized working fluid as a precautionary measure in case the fluid source 541 experiences a significant loss of fluid pressure during flight. A "significant loss of fluid pressure" in this context would include a pressure loss that renders the fluid source 541 incapable of operating the actuator 320. If such an event occurs, the flight control computer 560 sends a signal to a solenoid valve 682 allowing the pressurized working fluid stored in the accumulator 680 to flow to the EHSV 546 and the check valve 564, opening the check valve 564. At the same time, the computer 560 sends a control surface command to the EHSV 546 causing it to direct the pressurized working fluid from the accumulator 680 to either the first fluid port 531 or the second fluid port 532 as required to move the actuator 320 to the desired commanded position or, alternatively, to the centered position as shown in FIG. 4A. For example, if the actuator 320 is extended, then the EHSV 546 directs pressurized working fluid to the first fluid port 531 to retract the actuator 320 toward the centered position. Conversely, if the actuator 320 is retracted, then the EHSV 546 directs pressurized working fluid to the second fluid port 532 to extend the actuator toward the centered position. In this manner, the fluid accumulator 680 provides a backup feature that causes the actuator 320 to move the control surface 215 (FIGS. 2–4C) to a selected position in the event of a significant pressure loss. In one embodiment, the selected position can be the centered position as shown in FIG. 4A. The loss of fluid pressure and the post-failure command do not have to occur at or near the same time. In another embodiment, the selected position can be the last position commanded by the flight control computer 560. In other embodiments, the fluid accumulator 680 can be used to move the control surface 215 to yet other positions in the event of system pressure loss. In still further embodiments, hydro-mechanical devices can be used to position the control surface 215 with the fluid accumulator 680, instead of the signal from the flight control computer 560. In another embodiment, the fluid accumulator 680 can be replaced by an electric motor that provides power to a fluid pump which in turn can provide the back up feature described above. In this other embodiment, the elecetric motor/pump assembly or the like can be selected to satisfy the control surface response time requirements an/or weight and cost constraints.

A control surface held in a deflected position (i.e. an up or down position) during the course of a flight may reduce aircraft range. One feature of aspects of the embodiment described above with reference to FIG. 6 is that the fluid accumulator 680 provides a means for returning the control surface 215 (FIGS. 2–4C) to a centered position in the event of a significant pressure drop in the fluid source 541. Accordingly, one advantage of this feature is that a hydraulic system failure that renders a particular control surface inoperative will not reduce aircraft range.

Figure 7:
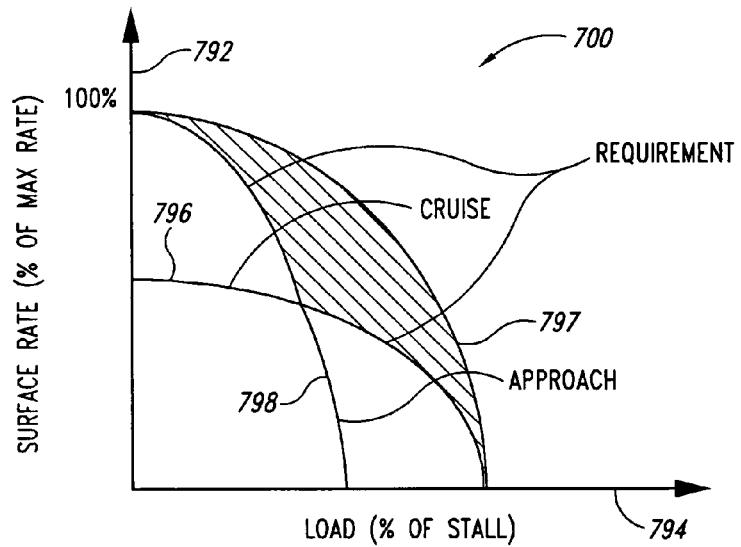
FIG. 7 is a graph illustrating control surface rate of movement versus control surface load in accordance with an embodiment of the invention.

FIG. 7 illustrates a graph 700 of control surface movement rate ("rate") versus control surface load ("load"), configured in accordance with an embodiment of the invention. The rate is measured along a vertical axis 792 and the load is measured along a horizontal axis 794. In one aspect of this embodiment, a cruise plot 796 illustrates the rate and load requirements on a control surface (such as the control surface 215 discussed above) during a cruise portion of flight. Similarly, an approach plot 798 illustrates the rate and load requirements on the control surface during a landing approach portion of flight. A control surface operating according to the graph 700 will in general experience higher loads while maneuvering during the cruise portion of flight than while maneuvering during the landing approach. Conversely, however, such a control surface will in general move at a higher rate during the landing approach than during the cruise portion of flight. When taken together, these requirements result in a control surface operating system that operates according to the design plot 797 to move at the maximum rate during the landing approach and carry the maximum load during cruise flight. As shown by the cross-hatching in FIG. 7, such a control surface operating system is over-designed for any control surface movement between the maximum rate and the maximum load.

Figure 8A:
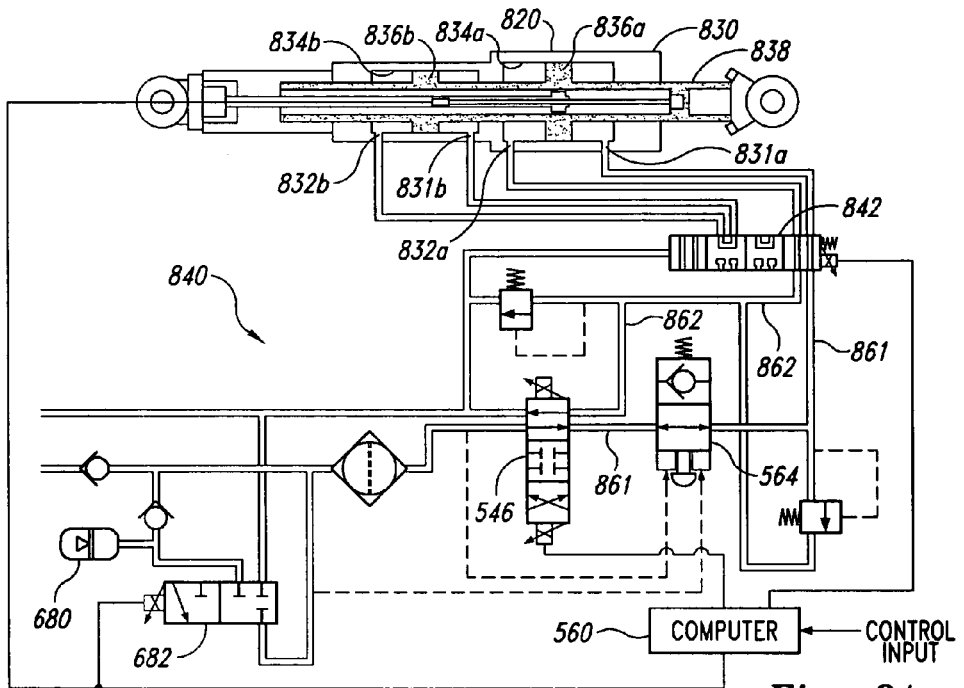
FIGS. 8A and 8B are schematic diagrams of an actuator and an associated fluid distribution system configured in accordance with a further embodiment of the invention.
Figure 8B:
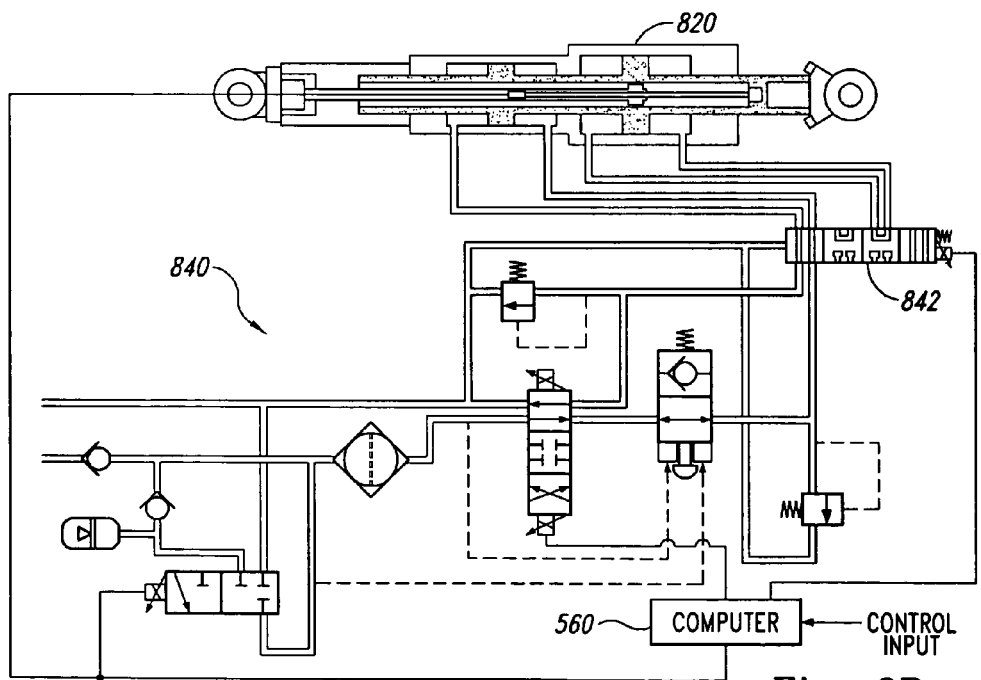

FIGS. 8A and 8B are schematic diagrams of an actuator 820 and an associated fluid distribution system 840 configured in accordance with a further embodiment of the invention. In FIG. 8A, the actuator 820 and the fluid distribution system 840 is configured to operate in a first mode, such as a cruise mode, in which the aerodynamic load on the corresponding control surface is highest. In FIG. 8B, the actuator 820 and the fluid distribution system 840 is configured to operate in a second mode, such as an approach mode, in which the aerodynamic load on the corresponding control surface is lower but the control surface must move at a higher rate. Referring first to FIG. 8A, in one aspect of this embodiment, the actuator 820 includes an actuator body 830 having a first piston bore 834a and a second piston bore 834b. In the illustrated embodiment, the piston bores 834 are axially aligned. In other embodiments, however, the piston bores can have other configurations. For example, in one other embodiment, the piston bores 834 can be side-by-side in a lateral arrangement. A first piston 836a having a first piston area is slidably disposed within the first piston bore 834a. Similarly, a second piston 836b having a second piston area different than the first piston area can be slidably disposed in the second piston bore 834b. Both pistons 834 can be fixedly attached to a piston rod 838. In another aspect of this embodiment, the actuator body 830 further includes a first fluid port 831a and a second fluid port 832a configured to flow pressurized working fluid into and out of the first piston bore 834a. Similarly, the actuator body 830 can also include a third fluid port 831b and a fourth fluid port 832b configured to flow pressurized working fluid into and out of the second piston bore 834b.

In a further aspect of this embodiment, the fluid distribution system 840 can include the EHSV 546, the check valve 564, the accumulator 680, and the solenoid valve 682 described above with reference to FIGS. 5 and 6. In this embodiment, these components can function at least generally as described above to control the flow of pressurized working fluid to and from an energy management valve 842 via a first fluid circuit 861 and a second fluid circuit 862. In another aspect of this embodiment, the flight control computer 560 can switch the energy management valve 842 between a first configuration or position as shown in FIG. 8A and a second configuration or position as shown in FIG. 8B depending on the particular flight mode (e.g. cruise mode or approach mode). For example, in the cruise mode where higher actuation force is required, the flight control computer 560 switches the energy management valve 842 to the first position as shown in FIG. 8A so that pressurized working fluid will flow into and out of the first piston bore 834a for actuator movement. Being the larger of the two pistons, the first piston 836a provides the most force for moving the control surface under the heavier cruise loads. In the first position as shown in FIG. 8A, the energy management valve 842 allows working fluid to flow into and out of the second piston bore 834b in a bypass mode to minimize resistance against the first piston 836a.

In the approach mode where higher actuation rate is required, the flight control computer 560 switches the energy management valve 842 to the second position as shown in FIG. 8B so that pressurized working fluid will flow into and out of the second piston bore 834b for actuator movement. Being the smaller of the two pistons, the second piston 836b provides the highest rate for moving the control surface quickly under approach conditions. In the second position as shown in FIG. 8B, the energy management valve 842 allows working fluid to flow into and out of the first piston bore 834a in a bypass mode to minimize resistance against the second piston 836b.

The configuration of the fluid distribution system 840 described above with reference to FIGS. 8A and 8B is but one configuration of fluid distribution system that can be used in conjunction with the actuator 820 to provide the two mode operating features described above. Accordingly, in other embodiments, the fluid distribution system 840 can have other configurations and include other components. For example, in one other embodiment, the fluid accumulator 680, the associated solenoid valve 682, and the check valve 564 can be omitted. In this other embodiment, the particular features provided by the omitted components may no longer be available, however, the basic two mode operating features of the actuator 820 can still be utilized.

In another embodiment mentioned above, the first and second piston bores 834*a, b* can be positioned side-by-side instead of being axially aligned as illustrated in FIGS. 8A and 8B. In this particular embodiment, it may be advantageous to have independent piston rods fixedly attached to each of the pistons operating in the respective piston bores. In a further embodiment, the single piston rod 838 can be replaced by two piston rods, each being fixed to one of the first piston 834*a* or the second piston 834*b*. The two piston rods in this embodiment can be configured to telescope with respect to each other for actuator extension and retraction.

In yet another embodiment, an actuator in accordance with the present invention can have a non-linear configuration instead of the linear configuration described above with reference to FIGS. 3–8B. For example, in one other embodiment, an actuator configured in accordance with the present invention can include a rotary actuator body configured to effectuate rotary motion for control surface movement. In such an embodiment, the actuator can include dual rotary components of different sizes to provide the two mode operating capability described above with reference to FIGS. 8A and 8B. Accordingly, the present invention is not limited to the particular embodiments illustrated in FIGS. 2–8B described above.

Another feature of aspects of the embodiment described above with reference to FIG. 6 is that during particular flight modes, such as during the landing approach, the pressurized working fluid from the accumulator 680 can be used to increase the actuator rate and, accordingly, the control surface rate. The difference between the rate command and the position command can be determined by the flight control computer 560 and can be used to energize the solenoid valve 682. Thus, when working fluid is drawn from the accumulator 680 in this manner, the flow demand from the fluid source will be less than that of the actuator configuration described above with reference to FIG. 5 which lacks the accumulator.

One feature of aspects of the embodiment described above with reference to FIG. 6 and FIGS. 8A–B is that the actuator is able to meet the system requirements illustrated in FIG. 7 with a smaller fluid flow demand from the fluid source. One advantage of the feature is that the associated fluid source/pump combination is smaller, as is the amount of power extracted from the aircraft engine. This advantage can result in less cost and less weight for the aircraft.

Figure 9:
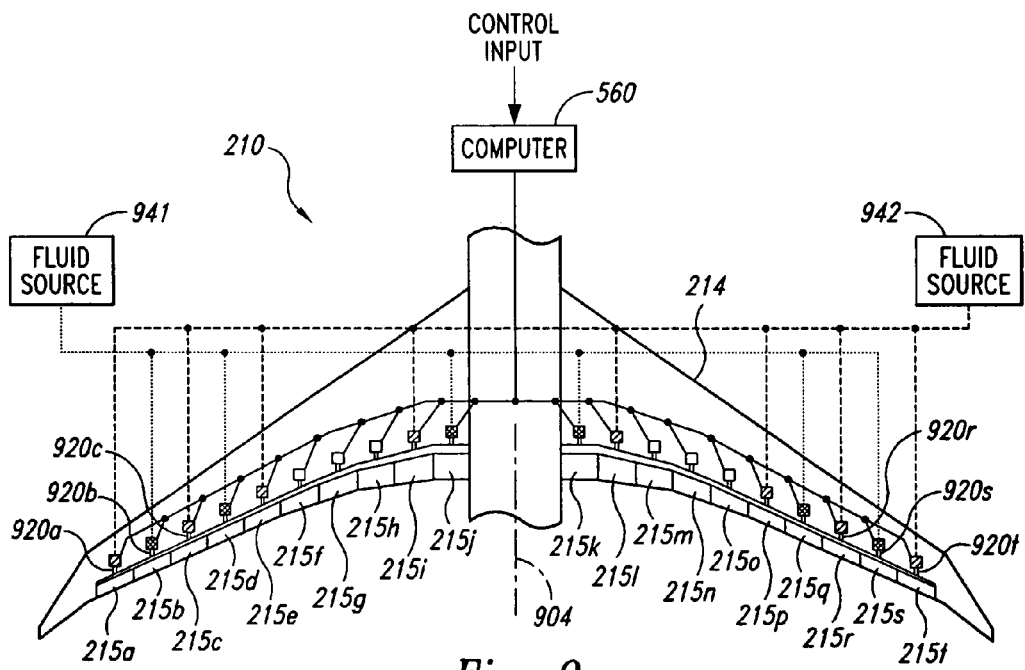
FIG. 9 is a partially schematic top view of an aircraft wing having a control surface system configured in accordance with an embodiment of the invention.

FIG. 9 is a top schematic view of the wing 214 of FIG. 2 having a control surface system configured in accordance with an embodiment of the invention. In one aspect of this embodiment, actuators 920*a–t* are operably coupled between the wing 214 and the control surfaces 215*a–t* in one-to-one correspondence. The actuators 920 can in certain embodiments include one or more of the actuator 320 described above with reference to FIGS. 3–6, or one or more of the actuator 820 described above with reference to FIGS. 8A–B. In other embodiments, the actuators 920 can include other types of actuators. For example, in one other embodiment, the actuators 920*f–h* and 920*m–o* can include electric actuators. Such electric actuators can include Electro-Hy-drostatic Actuators (EHA) or Integrated actuator packages (IAP). Electric and hydraulic actuator combinations may satisfy the minimum aircraft control requirements (MAC) at an optimum cost and weight.

In yet another aspect of this embodiment, a first fluid source 941 (shown schematically) can provide pressurized working fluid to the actuators 920*b*, 920*d*, 920*j*, 920*k*, 920*q*, and 920*s*. Similarly, a second fluid source 942 (shown schematically) can provide pressurized working fluid to the actuators 920*a*, 920*c*, 920*e*, 920*i*, 9201, 920*p*, 920*r*, and 920*t*. In one embodiment, providing dual fluid sources in this manner can provide a level of redundancy to enhance the reliability of the control surface operating system 210.

In one embodiment, the actuators 920*h*–920*m* can include electro-mechanical actuators. Such actuators may be suitable for those embodiments where relatively slow moving actuators are desired. In one aspect of this embodiment, electromechanical actuators may avoid possible fluid leakage and other disadvantages often associated with hydraulic actuators.

The foregoing arrangement of actuators and control surfaces is but one possible configuration in accordance with the present invention. Accordingly, in other embodiments, control surface operating systems configured in accordance with the present invention can use other actuator arrangements without departing from the spirit or scope of the present invention. For example, in one other embodiment, all of the actuators 920 can be the same. That is, all of the actuators 920 can include the actuator 320 described above with reference to FIGS. 3–6. Further, all of the actuators 920 can include associated fluid systems similar to at least one of the fluid system 540 described above with reference to FIG. 5 and the fluid system 640 described above with reference to FIG. 6. In yet another embodiment, the dual fluid sources 941, 942 can be replaced with a single fluid source. Alternatively, additional fluid sources can be provided to further enhance the redundancy of the system.

In operation, the computer 560 can control the control surfaces 215 in different modes in response to pilot input and depending on the particular flight mode of the aircraft 200 (FIG. 2). As a result, the control surfaces 215 can act as multi-function control surfaces providing one aerodynamic function at one point in flight and another aerodynamic function at another point in flight. For example, in one embodiment, the four outermost control surfaces 215*a–d* on the left side of the wing 214 can move differentially with respect to the four outermost control surfaces 215*q–t* on the right side of the wing 214 to produce roll of the aircraft 200 about a longitudinal axis 904. Such differential motion of the outermost control surfaces 215*a–d, q–t* may be appropriate during cruise flight and may be similar to a conventional control surface motion traditionally associated with ailerons. In other flight modes, for example, during descent, the outermost control surfaces 215*a–d, q–t* can be deflected upward in coordinated movement to increase the drag on the aircraft 200. Conversely, during landing approach, the computer 560 may control both sets of outermost control surfaces 215*a–d, q–t* to deflect slightly downward in coordinated movement to increase the lift on the aircraft 200. Such coordinated movement of the left and right outermost control surfaces 215 may be similar to the movement commonly associated with conventional trailing edge flaps. In addition, the control surfaces 215 can be moved to provide wing load alleviation during various portions of flight to reduce the load on the wing structure and thereby allow for lighter structure.

One feature of aspects of the embodiment described above with reference to FIG. 9 is that the control surfaces 215 are multi-functional and thus can perform two or more functions during flight depending on the particular flight mode. One advantage of this feature is that the wing 214 does not have to carry other conventional types of control surfaces that only perform single functions during flight. For example, conventional trailing edge flaps are generally used only at two times during the course of a typical flight, mainly during takeoff and landing. During cruise flight, these control surfaces and their associate actuation systems serve no useful purpose. In contrast, the multi-functional control surfaces 215 described above with reference to FIG. 9 are able to provide useful functions throughout the flight regime. As a result, airframe weight can be reduced over conventional control systems.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An aircraft system comprising:
   an actuator having a piston bore and a piston slidably disposed within the piston bore, the piston having a first piston surface with a first area and a second piston surface opposite to the first piston surface with a second area, the second area being at least generally equivalent to the first area, the actuator further having at least a first fluid port and a second fluid port, the first fluid port being positioned in fluid communication with the first piston surface and the second fluid port being positioned in fluid communication with the second piston surface;
   a fluid distribution system having at least a first fluid circuit and a second fluid circuit, wherein the first fluid circuit is configured to provide pressurized working fluid from a fluid source to the first fluid port to move the piston in a first direction, and wherein the second fluid circuit is configured to provide pressurized working fluid from the fluid source to the second fluid port to move the piston in a second direction opposite to the first direction; and
   a check valve positioned in the first fluid circuit, wherein the check valve is configured to open in response to receiving pressurized working fluid from the fluid source, the open check valve allowing pressurized working fluid to flow at least to the first fluid port for moving the piston in the first direction.

2. The aircraft system of claim 1 wherein the check valve is further configured to close in the absence of receiving pressurized working fluid from the fluid source, the closed check valve at least generally preventing working fluid from flowing to or from the first fluid port and thereby at least generally preventing the piston from moving in at least the first direction.

3. The aircraft system of claim 1, further comprising a pilot pressure circuit at least partially separate from the first fluid circuit, the pilot pressure circuit providing pressurized working fluid from the fluid source to the check valve to open the check valve.

4. The aircraft system of claim 1 wherein the check valve is hydraulically actuated.

5. The aircraft system of claim 1 wherein the check valve is electrically actuated.

6. The aircraft system of claim 1 further comprising a servo valve positioned between the fluid source and the check valve, wherein the servo valve has at least a first operating position and a second operating position, wherein when the servo valve is in the first operating position the servo valve allows pressurized working fluid to flow through the first fluid circuit and the check valve to the first fluid port to move the piston in the first direction, and wherein when the servo valve is in the second operating position the servo valve allows pressurized working fluid to flow through the second fluid circuit to the second fluid port to move the piston in the second direction.

7. The aircraft system of claim 1 further comprising a servo valve positioned between the fluid source and the check valve, wherein the servo valve has at least a first operating position and a second operating position, wherein when the servo valve is in the first operating position the servo valve allows pressurized working fluid to flow through the first fluid circuit and the check valve to the first fluid port to move the piston in the first direction, wherein when the servo valve is in the second operating position the servo valve allows pressurized working fluid to flow through the second fluid circuit to the second fluid port to move the piston in the second direction, and wherein the fluid distribution system further includes a pilot pressure circuit configured to flow pressurized working fluid from the fluid source to the check valve bypassing the servo valve, wherein the check valve is configured to open in response to receiving pressurized working fluid from the fluid source via the pilot pressure circuit.

8. The aircraft system of claim 1, further comprising:
   a fuselage;
   an aerodynamic surface extending outwardly from the fuselage; and
   a control surface movably coupled to the aerodynamic surface, wherein the actuator is operably coupled between the aerodynamic surface and the control surface, and wherein movement of the piston in at least the first direction cause the control surface to move relative to the aerodynamic surface.

9. The aircraft system of claim 1, further comprising:
   a fuselage;
   a wing extending outwardly from the fuselage; and
   a control surface movably coupled to the wing, wherein the actuator is operably coupled between the wing and the control surface, and wherein movement of the piston in at least the first direction causes the control surface to move relative to the wing.

10. The aircraft system of claim 1, further comprising:
    a fuselage;
    a wing extending outwardly from the fuselage; and
    a control surface pivotally coupled to the wing about a hinge-line, wherein the actuator is operably coupled between the wing and the control surface in one-to-one correspondence, and wherein movement of the piston in the first direction causes the control surface to move relative to the wing.

11. The aircraft system of claim 1, further comprising:
    a fuselage;
    a wing extending outwardly from the fuselage; and
    a control surface pivotally coupled to the wing about a hinge-line, wherein the actuator is operably coupled between the wing and the control surface in one-to-one correspondence, and wherein movement of the piston in the first direction causes the control surface to move upwardly relative to the wing.

12. An aircraft system comprising:
  an actuator having a piston bore and a piston slidably disposed within the piston bore, the piston having a first piston surface with a first area and a second piston surface opposite to the first piston surface with a second area, the second area being at least generally equivalent to the first area, the actuator further having at least a first fluid port positioned in flow communication with the first piston surface;
  a fluid distribution system having at least a first fluid circuit configured to flow pressurized working fluid from a fluid source to the first fluid port to move the piston in the first direction; and
  a check valve positioned in the first fluid circuit, wherein the check valve is configured to open in response to receiving pressurized working fluid from the fluid source, the open check valve allowing pressurized working fluid to flow at least to the first fluid port for moving the piston in the first direction.

13. The aircraft system of claim 12 wherein the actuator is a linear actuator.

14. The aircraft system of claim 12 wherein the check valve is further configured to close in the absence of receiving pressurized working fluid from the fluid source, the closed check valve at least generally preventing working fluid from flowing to or from the first fluid port and thereby at least generally preventing the piston from moving in at least the first direction.

15. The aircraft system of claim 12, further comprising a pilot pressure circuit at least partially separate from the first fluid circuit, the pilot pressure circuit providing pressurized working fluid from the fluid source to the check valve to open the check valve.

16. The aircraft system of claim 12 further comprising a servo valve positioned between the fluid source and the check valve, wherein the servo valve has at least a first operating position and a second operating position, wherein when the servo valve is in the first operating position the servo valve allows pressurized working fluid to flow through the first fluid circuit and the check valve to the first fluid port to move the piston in the first direction, and wherein when the servo valve is in the second operating position the servo valve allows working fluid to flow back from the first fluid port through the first fluid circuit and the check valve to the servo valve.

17. The aircraft system of claim 12, further comprising:
  a fuselage;
  an aerodynamic surface extending outwardly from the fuselage; and
  a control surface movably coupled to the aerodynamic surface, wherein the actuator is operably coupled between the aerodynamic surface and the control surface, and wherein movement of the piston in at least the first direction cause the control surface to move relative to the aerodynamic surface.

\* \* \* \* \*